R. KENT.
Improvement in Dough Mixers.
No. 123,403.   Fig. 1.   Patented Feb. 6, 1872.
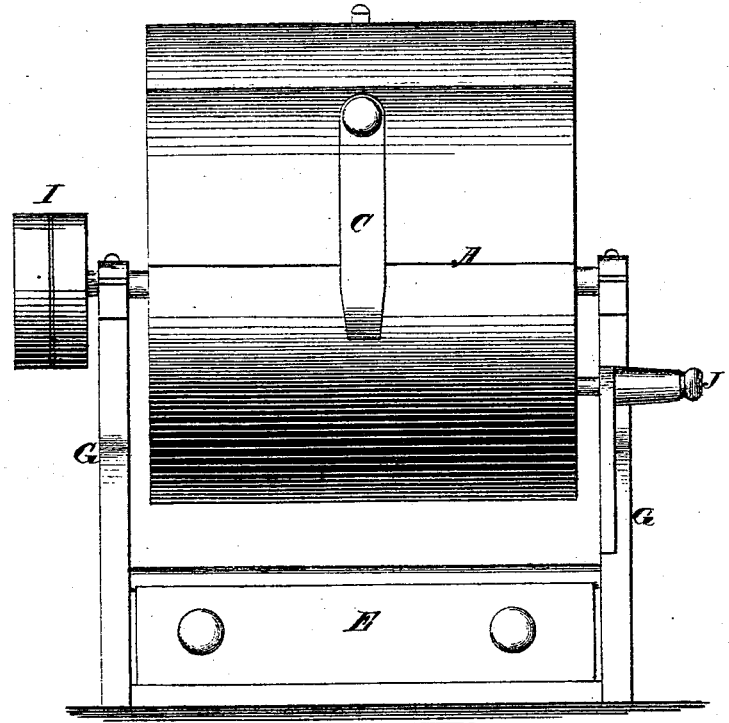
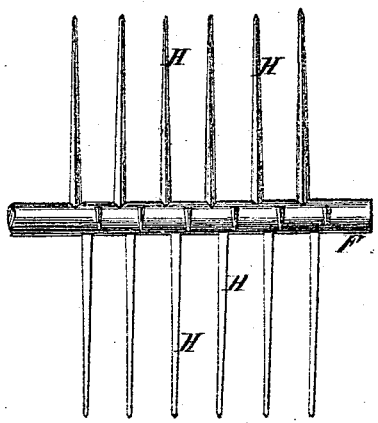
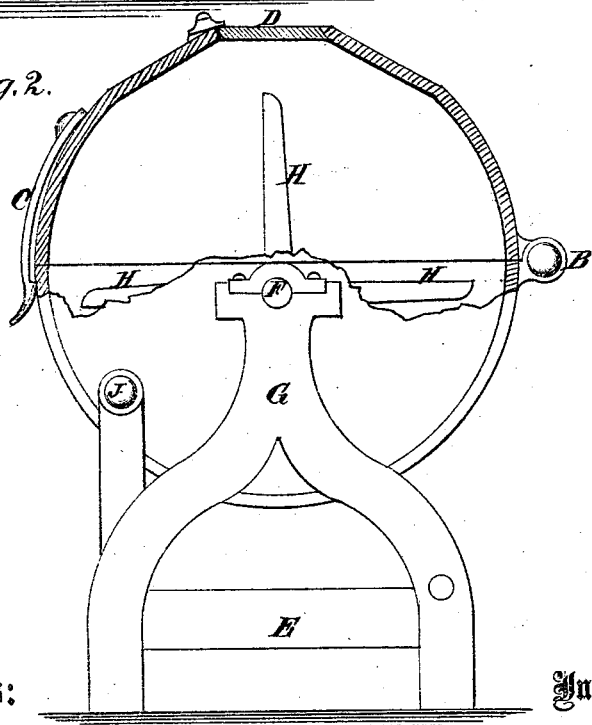
Witnesses:
John Becher
Geo. W. Mabee
Inventor:
R. Kent
Per
Attorneys.

UNITED STATES PATENT OFFICE.

REUBEN KENT, OF PORTLAND, MAINE.

IMPROVEMENT IN DOUGH-MIXERS.

Specification forming part of Letters Patent No. 123,403, dated February 6, 1872.

Specification describing a new and Improved Dough-Mixing Machine, invented by REUBEN KENT, of Portland, in the county of Cumberland, State of Maine.

The object of this invention is to provide means for mixing dough in the manufacture of bread, crackers, &c.; and it consists in the construction, arrangement, and combination of parts, hereinafter described.

In the accompanying drawing, Figure 1 represents a side elevation of the machine. Fig. 2 is an end elevation, partly in section. Fig. 3 is a side view of the revolving mixer.

Similar letters of reference indicate corresponding parts.

A is a horizontal cylinder made of any suitable material. If made of wood it may be lined with galvanized sheet-iron or other sheet metal. This cylinder is made in two parts, hinged together, as seen at B, and fastened together when closed by the spring-catch C, or in any other suitable manner. The flour to be mixed into dough, with water and other material, in well-known proportions, is introduced when the cylinder is open on its hinges. D is a removable cover to an opening in the cylinder through which the dough is discharged into the drawer E beneath, by revolving the cylinder. F is a shaft which passes through near the center of the cylinder. This shaft revolves in journals which are supported in boxes on the stands G G, which stands rest upon the floor, as seen in the drawing. The shaft is provided with four, more or less, rows of knives or teeth, H, arranged substantially as seen in Fig. 3. The mixer thus formed is revolved by means of a belt on the pulley I from any suitable motive power, or by means of a crank by hand, or in any manner to give it the desired speed. The shaft is arranged so that the knives sweep nearly to the bottom of the cylinder when revolving. When the machine is receiving its flour, &c., and when it is in operation, the cylinder is held stationary by means of the sliding pin J, which enters a hole in the end of the cylinder, as seen in Fig. 1. By a rapid revolution of the shaft the dough is mixed in a few seconds of time, when the cover D is removed and the cylinder is reversed, which discharges it into the drawer E, as before stated.

With this machine a very large amount of work can be performed in a very short space of time.

Having thus described my invention, I claim as new and desire to secure by Letters Patent—

In a machine for mixing dough, the cylinder A made in two parts, connected by hinge B and catch C and provided with the cover D, the shaft F, the knives H, stop-pin J, drawer E, and stands G, all constructed, arranged, and operating as shown and described.

REUBEN KENT.

Witnesses:
T. B. MOSHER,
ALEX. F. ROBERTS.